United States Patent Office 3,040,085
Patented June 19, 1962

3,040,085
ALPHA-FLUOROALKYL NITRITES AND NITRATES, OMEGA-NITROSO- AND OMEGA-NITROPER - FLUOROALKANOYL FLUORIDES, AND THEIR PREPARATION
Sam Andreades, Wilmington, Del., assignor to E. I. du Pont de Nemours and Company, Wilmington, Del., a corporation of Delaware
No Drawing. Filed Sept. 27, 1960, Ser. No. 58,635
21 Claims. (Cl. 260—466)

This application is a continuation-in-part of application Serial No. 12,498, filed by Sam Andreades on March 3, 1960, and now abandoned. The invention covered relates to, and has as its principal objects the provision of, a new class of fluorocarbon derivatives and processes for producing them.

Perfluoroolefins are known to react with nitrogen dioxide to give mixtures of disubstituted perfluorinated compounds. Thus, tetrafluoroethylene is known to react with nitrogen dioxide to give a complex mixture composed of perfluorinated alkyl dinitro-, nitronitroso-, and nitronitrite compounds of the type $O_2N(CF_2CF_2)_nX$, where X is $NO_2$, ONO, or NO and $n$ is a cardinal number, preponderantly 1. These compounds are characterized by high thermal stability. Thus, 2-nitrotetrafluoroethyl nitrite is pyrolyzed only above 250° C. yielding oxalyl fluoride. Again, characteristically, some of these perfluorinated disubstituted compounds are hydrolyzed to dibasic acids as illustrated by perfluorocyclobutane-1,2-dinitrite which hydrolyzes to perfluorosuccinic acid.

It has now been found that new and highly reactive fluorinated secondary alkyl mononitrites and mononitrates represented by the formula

can be prepared by the process described below. In this formula Y represents a nitroso (NO) or a nitro ($NO_2$) group, i.e., OY may be either a nitrite or a nitrate group; R and R′ individually represent the same or different perfluoroalkyl, perfluorocycloalkyl, ω-hydroperfluoroalkyl, and ω-chloroperfluoroalkyl groups, and R and R′ taken together (—R—R′—) can be a perfluoroalkylene group. These products are referred to as "secondary" alkyl nitrites and nitrates since the carbons to which the nitrite and nitrate groups (OY) are attached are also attached to two other carbons. They can also be referred to as α-fluoro secondary nitrites and nitrates since the carbon bearing said nitrite and nitrate groups also has a fluorine attached thereto.

It has also been found that new and highly reactive ω-nitroso- and ω-nitropolyfluoroalkanoyl fluorides of formula

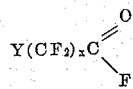

where $x$ represents a cardinal number greater than 2, can be prepared by the thermal rearrangement of compounds of formula

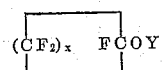

this being a group of compounds wherein R and R′ are joined as described above.

The fluorinated secondary alkyl nitrites and nitrates of this invention are prepared by reaction of nitrosyl fluoride (NOF) or nitryl fluoride ($NO_2F$) represented by the generic formula F—Y, where Y is defined as above, with an α-fluorocarbonyl compound as illustrated by the following equation, wherein R—CO—R′ represents a fluorinated ketone and R and R′ are defined as above:

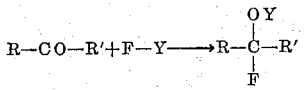

Preferably the total number of carbon atoms in R and R′ combined does not exceed 18.

One process for preparing the nitrites and nitrates consists in bringing nitrosyl fluoride or nitryl fluoride into intimate contact in a closed system under anhydrous conditions with a fluorinated ketone as already defined. The reaction mixture is generally maintained at reaction temperature until the reaction is essentially complete as indicated by the lack of a further decrease in pressure due to the absorption of the more volatile reactant, i.e., nitrosyl fluoride or nitryl fluoride. The reaction can also be followed by the decrease in the infra-red intensity of the carbonyl band and the increase in the nitrite or nitrate band in cases where these bands are sufficiently different in wave length. Reaction between the fluoroketone and either nitrosyl fluoride or nitryl fluoride takes place very rapidly, even instantaneously in some cases, but the reaction mixture is generally maintained at the reaction temperature for periods ranging from one or two minutes up to several hours.

The fluorinated secondary alkyl nitrites and nitrates of this invention are in equilibrium with the starting materials. At high or moderate temperatures, the equilibrium shifts and considerable amounts of fluoroketone and nitrosyl or nitryl fluoride may be present. The fluorinated secondary alkyl nitrites and nitrates of this invention can usually be purified by distillation under reduced pressure or by crystallization in some instances.

The use of essentially equimolar amounts of the fluoroketones and nitrosyl or nitryl fluorides are preferred for preparing the fluorinated products of this invention. However, an excess of either reactant can be used if desired. The process is operable at temperatures ranging from −195° C. to 55° C. and can be carried out at even higher temperatures, provided it is below the temperature at which decomposition to an ω-nitrosopolyfluoroalkanoyl fluoride or an ω-nitropolyfluoroalkanoyl fluoride becomes pronounced. However, the preferred temperature range is −80° to 30° C.

The pressure under which the reaction is carried out is not critical and can range from superatmospheric to subatmospheric, but superatmospheric pressure favors the formation of the fluorinated secondary alkyl nitrites and nitrates. In the preferred process, the reaction is carried out at the pressure developed under the operating conditions by the mixture of reactants and products in a closed reaction vessel.

The reaction is carried out in equipment constructed of materials that are essentially inert to nitrosyl and nitryl fluorides. Examples of suitable materials of construction include polytetrafluoroethylene, polyethylene, nickel, and some of the high nickel alloys such as monel metal and Hastelloy. All phases of the process are carried out under anhydrous conditions.

The perfluorocycloalkyl nitrites and nitrates of this invention can be thermally rearranged to ω-nitroso- and ω-nitroperfluoroalkanoyl fluorides, as illustrated by the following equation:

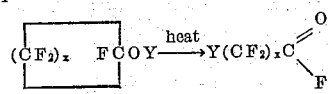

This rearrangement can be carried out either by a batch process as in a bomb-type reactor, or by a continuous flow process as in a tubular reactor. The pressure under which the rearrangement is carried out is not critical and can range from subatmospheric to superatmospheric. Some rearrangement occurs at temperatures as low as 15° C., but the process is optimumly carried out at above 100° C. and may be as high as 250° C. or even higher, especially at short contact time. The time at which the rearrangement is effected varies inversely with the temperature from about 0.01 second at high temperature to 2–3 hours or even longer at lower (40–50° C.) temperatures.

The preparation and properties of the fluorinated secondary alkyl nitrites and nitrates and of the ω-nitroso- and ω-nitroperfluoroalkanoyl fluorides of this invention are described in more detail in the following examples in which ingredients are expressed in parts by weight unless otherwise noted.

EXAMPLE I

*Heptafluorocyclobutyl Nitrite*

A dry reactor (80 parts capacity) lined with Hastelloy "C" (a high nickel alloy) is evacuated, cooled to −50° C., and charged with 48 parts of hexafluorocyclobutanone and 11 parts of nitrosyl fluoride. The reactor is closed and allowed to warm slowly to room temperature with agitation. The absence of a significant positive pressure in the system is noted at this point. The mixture is maintained at room temperature with agitation for about 18 hours at which time there still is no positive pressure on the system. The reaction product, which is a yellow liquid, is distilled in vacuo and yields 49.1 parts (96% of theory) of heptafluorocyclobutyl nitrite, B.P. 7° C. (105 mm.), which crystallizes when cooled in a solid carbon dioxide (Dry Ice) cooling bath. In another run, the product distilled at atmospheric pressure with some decomposition, B.P. 54–55° C.

Heptafluorocyclobutyl nitrite is extremely sensitive to moisture and is accordingly handled and stored in a dry atmosphere. Furthermore, this product equilibrates to some extent at room temperature with the starting ketone and nitrosyl fluoride which reacts with glass. Elemental analyses are best obtained from samples in sealed vials which are stored below 0° C. and sampled in a dry atmosphere.

*Analysis.*—Calcd. for $C_4F_7NO_2$: C, 21.16; F, 58.59; N, 6.17; M.W., 227.04. Found: C, 21.65; F, 58.75; N, 5.98 (Dumas); M.W., 228 (fr. p. in benzene).

The ultraviolet spectrum of the heptafluorocyclobutyl nitrite of Example I in isooctane displayed a $\lambda_{max.}$ of 348 m$\mu$ ($\epsilon=60$) and absorption at 210 m$\mu$ ($\epsilon=1000$). The fluorine nuclear magnetic resonance spectrum of the nitrite displayed a weak-strong-strong-weak pattern attributed to the four $\beta$-fluorine atoms, a single peak attributed to the two $\gamma$-fluorine atoms, and a smaller single peak assigned to the single $\alpha$-fluorine atom. The integrated intensities of the four-line pattern relative to the latter two bands were in the correct ratio, ca. 4:2:1, respectively.

The infrared spectrum of the heptafluorocyclobutyl nitrite displayed intense nitrite absorption at 1860 cm.$^{-1}$ and a very weak band at 1750 cm.$^{-1}$. Thus, $\alpha$-fluorine substitution causes a pronounced shift of the N=O stretching peak to higher frequencies as compared with unsubstituted alkyl nitrites.

The above physical data are completely consistent with the heptafluorocyclobutyl nitrite structure,

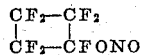

Heptafluorocyclobutyl nitrite is readily hydrolyzed. Thus, when water (2.5 parts) is gradually added to the nitrite (14.5 parts), a vigorous exothermic reaction takes place and brown fumes are evolved. Warming the resultant green mixture on a steam bath for 10 minutes causes the evolution of more brown fumes and leaves a colorless liquid. Distillation of this liquid gives 10.7 parts (86% of the theoretical) of 1,1-dihydroxyhexafluorocyclobutane, B.P. 126–130° C., the major portion of which slowly crystallizes on standing at room temperature.

EXAMPLE II

*1,3-Dichloropentafluoro-2-Propyl Nitrite,*

$ClCF_2$—$C(F)(ONO)CF_2Cl$

A Hastelloy "C" reactor of 80 parts capacity is cooled to −50° C. and charged with 20 parts of sym.-dichlorotetrafluoroacetone and 4.5 parts of nitrosyl fluoride. The reactor is closed, shaken to agitate the reactants and warmed gradually to 30° C. at which time an internal pressure of 15 lb./sq. in. is noted. After shaking the mixture at 30° C. for 12 hours, 9.0 parts of volatile material and 11 parts of liquid are obtained. Rapid distillation of the liquid (B.P. 26° C. at 160 mm.) into a Dry-Ice trap gives 9.0 parts of a greenish distillate which turns orange-yellow on warming. The infrared spectrum of the product shows absorption at 1875 cm.$^{-1}$ (N=O stretching of the nitrite) and weaker absorption at about 1790 cm.$^{-1}$, probably due in part to the presence of the starting ketone.

*Analysis.*—Calcd. for $C_3F_5Cl_2NO_2$: Cl, 28.57; F, 38.30; N, 5.65. Found: Cl, 30.2, 30.8; F, 38.73, 38.60; N, 3.35, 3.34.

The nitrogen and chlorine values indicate an approximate composition of 70% 1,3-dichloropentafluoro-2-propyl nitrite and 30% starting ketone. The calculated values for percentage fluorine in the ketone and in the nitrite are very close. The fluorine nuclear magnetic resonance spectrum is also consistent with the above conclusion.

In other runs, infrared spectra indicate that a reaction occurs upon mixing sym.-dichlorotetrafluoroacetone and nitrosyl fluoride and that the mixture contains a predominant amount of the 1,3-dichloropentafluoro-2-propyl nitrite.

EXAMPLE III

*Pentadecafluoro-4-Heptyl Nitrite,*

$CF_3CF_2CF_2C(F)(ONO)CF_2CF_2CF_3$

Tetradecafluoro-4-heptanone at atmospheric pressure and 0° C. absorbs approximately an equimolar amount of the volatile (B.P. −56° C.) nitrosyl fluoride. However, on warming to room temperature, most of the nitrosyl fluoride is evolved. Thus, this product (pentadecafluoro-4-heptyl nitrite) is stable in the equilibrium mixture at 0° C. but at room temperature the equilibrium shifts in favor of starting materials.

EXAMPLE IV

*Heptafluorocyclobutyl Nitrate*

(A) An evacuated 300 parts capacity monel metal reactor is cooled in liquid nitrogen and charged with 19.0 parts of hexafluorocyclobutanone and 7.0 parts of nitryl fluoride. The vessel is closed and allowed to warm slowly to room temperature. A green-yellow liquid is formed which on distillation gives a yellow liquid, B.P. −6 to 0° C. (50 mm.) shown to be heptafluorocyclobutyl nitrate. The yield is essentially quantitative. Samples are sealed in glass vials under dry nitrogen and stored at −80° C. until analyzed.

*Analysis.*—Calcd. for $C_4F_7NO_3$: F, 54.7; N, 5.8; M.W., 243.05. Found: F, 55.2; N, 5.5, 5.2 (Dumas); M.W., 258, 235, 243 (freezing point in benzene).

The infrared spectrum of this product had a very strong band at 5.75$\mu$ attributed to the nitrate grouping and weak absorption at 5.3 and 6.15$\mu$ due to the presence of very small amounts of $\gamma$-nitrohexafluorobutyryl fluoride formed by rearrangement of the heptafluorocyclobutyl nitrate.

(B) Another preparation of heptafluorocyclobutyl nitrate is carried out in a polyethylene reactor which is cooled to −40° C. (freezing chlorobenzene bath) and equipped for magnetic stirring. To 12.0 parts (0.086 mole) of hexafluorocyclobutanone in the reactor is added 7 parts (0.11 mole) of nitryl fluoride over a period of approximately two hours. The excess nitryl fluoride escapes from the solution and is trapped at −80° C. The mixture is allowed to warm slowly to room temperature. The yellow heptafluorocyclobutyl nitrate is transferred to a "Pyrex" flask for distillation at which time attack on the glass is noted. The material distills completely at 16–18° C. (120 mm.) and 11.0 parts (67% yield) is obtained.

*Analysis.*—Calcd. for $C_4F_7NO_3$: C, 19.8; F, 54.7; N, 58; M.W., 243.05. Found: C, 21.4; F, 55.0; N, 5.2 (Dumas); M.W., 248, 238 (freezing point in benzene). The high carbon and low nitrogen percentages are probably caused by partial reversion of the heptafluorocyclobutyl nitrate to hexafluorocyclobutanone and nitryl fluoride and subsequent loss of $NO_2F$ while sampling, leaving the fluoroketone in solution. The infrared spectrum displayed strong fluoroalkyl nitrate absorption at 5.73μ in addition to strong bands at 5.29μ, 6.17μ, and 7.1μ which are due to

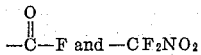

groups of γ-nitrohexafluorobutyryl fluoride formed by rearrangement of part of the heptafluorocyclobutyl nitrate during distillation.

(C) In another run pure heptafluorocyclobutyl nitrate is prepared by combining 16.5 parts (0.09 mole) of hexafluorocyclobutanone and 6.0 parts (0.09 mole) of nitryl fluoride in a monel vessel at −195° C. After warming to room temperature, immediate examination of this material by infrared spectra shows extremely strong absorption at 5.8μ and only very weak absorption at 5.33μ and 6.22μ indicating only traces of γ-nitrohexafluorobutyryl fluoride. The $F^{19}$ n-m-r spectrum at 56.4 mc. displayed three bands in the approximate ratio of 4:2:1 at +3035, 3149 and 3547 c.p.s., respectively, relative to trifluoroacetic acid as standard. These data are completely consistent with the proposed structure of heptafluorocyclobutyl nitrate, i.e.,

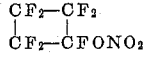

EXAMPLE V

*1,3-Dichloro-1,1,2,3,3-Pentafluoro-2-Propyl Nitrate,* $ClCF_2C(F)(ONO_2)CF_2Cl$ A polyethylene vessel containing 19 parts (0.09 mole) of sym.-dichlorotetrafluoroacetone and protected from atmospheric moisture with a "Drierite" anhydrous calcium sulfate exit tube, is cooled to 0° C. and magnetically stirred while 6.2 parts (0.09 mole) of nitryl fluoride is added, after which no additional nitryl fluoride is absorbed. On warming the mixture to room temperature, a small amount of nitryl fluoride is evolved indicating equilibration back to some starting materials. An infrared cell is charged with the 1,3-dichloro-1,1,2,3,3-pentafluoro-2-propyl nitrate under dry nitrogen and considerable nitryl fluoride escapes during this sampling process. The infrared spectrum of this material indicates the presence of large quantities of 1,3-dichloro-1,1,2,3,3-tetrafluoro-2-propyl nitrate by showing the very intense absorption associated with asymmetric N—O stretching of the nitrate grouping at 5.76μ and the very intense absorption associated with symmetric N—O stretching at 7.70μ. These bands are absent in the starting ketone although the presence of some starting ketone is indicated by the 5.6μ band in the infrared spectrum. The shift of these nitrate bands to lower wave lengths relative to unsubstituted alkyl nitrates is consistent with effects expected by introducing fluorine substituents, and supports the structure for the nitrate indicated above.

The foregoing examples give details for the preparation of specific fluorinated secondary alkyl nitrites and nitrates. Examples of other fluorinated secondary alkyl nitrites and nitrates that can be prepared in a similar manner are listed in Table I, together with the specific fluoroketones from which they are prepared by reaction with NOF and $NO_2F$, respectively.

TABLE I

| Fluoroketone | Fluorinated Secondary Alkyl | |
|---|---|---|
| | Nitrite | Nitrate |
| 1,1,3,3-tetrafluoro-2-propanone. | 1,1,2,3,3-pentafluoro-2-propyl nitrite. | 1,1,2,3,3-pentafluoro-2-propyl nitrate. |
| hexafluoro-2-propanone. | heptafluoro-2-propyl nitrite. | heptafluoro-2-propyl nitrate. |
| octafluoro-2-butanone. | nonafluoro-2-butyl nitrite. | nonafluoro-2-butyl nitrate. |
| decafluoro-2-pentanone. | undecafluoro-2-pentyl nitrite. | undecafluoro-2-pentyl nitrate. |
| dodecafluoro-3-hexanone. | tridecafluoro-3-hexyl nitrite. | tridecafluoro-3-hexyl nitrate. |
| octafluorocyclopentanone. | nonafluorocyclopentyl nitrite. | nonafluorocyclopentyl nitrate. |
| 1,7-dihydrododecafluoro-3-heptanone. | 1,7-dihydrotridecafluoro-3-heptyl nitrite. | 1,7-dihydrotridecafluoro-3-heptyl nitrate. |
| 1-hydropentafluoro-2-propanone. | 1-hydrohexafluoro-2-propyl nitrite. | 1-hydrohexafluoro-2-propyl nitrate. |
| undecafluorocyclohexyl trifluoromethyl ketone. | 1-undecafluorocyclohexyl-1, 2, 2, 2-tetrafluoro-1-ethyl nitrite. | 1-undecafluorocyclohexyl-1, 2, 2, 2-tetrafluoro-1-ethyl nitrate. |
| 1,9-dihydrohexadecafluoro-5-nonanone. | 1,9-dihydroheptadecafluoro-5-nonyl nitrite. | 1,9-dihydroheptadecafluoro-5-nonyl nitrate. |

EXAMPLE VI

*γ-Nitrohexafluorobutyryl Fluoride by Rearrangement of Heptafluorocyclobutyl Nitrate*

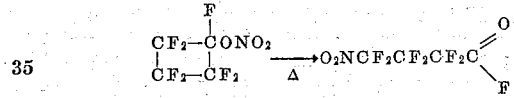

Ten grams of heptafluorocyclobutyl nitrate of Example IV is refluxed in a "Pyrex" flask for one hour. Distillation of this material gives two fractions (1) B.P. 20–32° C. and (2) B.P. 52–62° C. The infrared spectrum of fraction 1 displays strong absorption at 5.28, 5.4, 5.6, and 6.15μ indicating the presence of impurities along with the product. The infrared spectrum of fraction 2 displays very strong absorption at 5.28μ (CF=O) and 6.15μ (CF$_2$NO$_2$) indicating it to be reasonably pure γ-nitrohexafluorobutyryl fluoride. The $F^{19}$ n-m-r spectrum at 40.0 mc. of fraction 2 exhibits four signals in the approximate ratio of 1:2:2:2 at −4010, +865, 1696, and 1859 c.p.s., respectively, relative to trifluoroacetic acid as standard, which are attributable to the acyl fluoride and three CF$_2$ fluorine pairs, respectively. Fraction 2 reacts with water and the resulting aqueous solution gives a positive test for fluoride ion which is consistent with the presence of an acid fluoride grouping.

A sample of fraction 2 is converted to the N-phenyl γ-nitrohexafluorobutyramide derivative by reaction with an excess of aniline at about 0° C. The product is crystallized from heptane giving needle-like crystals melting at 82–82.5° C.

*Analysis.*—Calcd. for $C_{10}H_6F_6N_2O_3$: C, 38.00; H, 1.91; F, 36.1; N, 8.87. Found: C, 38.13; H, 2.08; F, 34.5; N, 8.41.

The infrared spectrum of this anilide shows NH absorption at 3.05μ, —CF$_2$NO$_2$ absorption at 6.25 and 7.5μ, amide C=O absorption at 5.85μ, a secondary amide NH band at 6.45μ, aromatic CH absorption at 3.25μ, aromatic C=C absorption at 6.25 and 6.65μ, CF stretching absorption in the 8μ region, and absorption characteristic of monosubstituted aromatic systems at 13.25 and 14.25μ.

EXAMPLE VII

*γ-Nitrosohexafluorobutyryl Fluoride by Rearrangement of Heptafluorocyclobutyl Nitrite*

Thirty-nine parts of heptafluorocyclobutyl nitrite is passed rapidly (ca. 25 cc. in 0.5 hour) through a nickel tube packed with Hastelloy "C" "Helipak" maintained at 250° C. The nickel tube is constructed of a pipe ($^{13}/_{16}''$ I.D., $1^1/_{16}''$ O.D.), 18" long and approximately the center 3" of this reactor is heated in the neighborhood of 250° C. The system is evacuated to 0.1 mm. The more rapid the addition, the darker blue is the product indicating greater conversions to the nitroso compound with higher flow rates or shorter retention times. The products are collected in a trap cooled in liquid nitrogen. Distillation of the product gives four fractions: (1) B.P. 4° C. (270 mm.), ca. 1 cc., deep blue; (2) B.P. 4–21° C. (270 mm.), ca. 3.5 cc., deep blue-green; (3) B.P. 21–27° C. (270 mm.), ca. 10 cc., starting material; and (4) B.P. 6° C. (1 mm.), ca. 2 cc. Fractions 1 and 2 are cooled in Dry Ice in order to freeze out nitrogen dioxide. The blue liquid is then decanted from the white solid under dry nitrogen giving 6.0 g. of liquid γ-nitrosohexafluorobutyryl fluoride, representing a 16% conversion based on the nitrite. On redistillation the acid fluoride boils at 30–35° C. The $F^{19}$ n-m-r spectrum at 40.0 mc. of this γ-nitrosohexafluorobutyryl fluoride shows an acid fluoride signal at −3982 c.p.s. and three additional signals at +1550, +1708, +1950 c.p.s. (relative to trifluoroacetic acid at 0 c.p.s.) with approximate integrated intensity ratios of 1:2:2:2, respectively.

EXAMPLE VIII

γ-Nitrosohexafluorobutyryl fluoride and γ-nitrohexafluorobutyryl fluoride can be prepared directly from hexafluorocyclobutanone and nitrosyl fluoride.

(A) A pressure vessel of 100 parts capacity lined with Hastelloy "C" is charged with 29.5 parts (0.165 mole) of hexafluorocyclobutanone and 8.4 parts (0.171 mole) of nitrosyl fluoride at about −195° C. The mixture is heated to 100° C. during the course of 0.5 hour. Twenty-three parts of blue liquid is recovered and distilled giving two fractions: (1) 3.5 parts of deep blue liquid boiling at 18–21° C. and (2) 1.5 parts of almost colorless liquid boiling mainly at 53–55° C. Some starting material and higher boiling product is also obtained in this example.

The infrared spectrum indicates that fraction 1 is γ-nitrosohexafluorobutyryl fluoride. The acid fluoride carbonyl absorption occurs at 5.3μ and the nitroso absorption at 6.15μ. Strong CF absorption is also present. The blue color of fraction 1 is also consistent with the presence of a perfluorinated nitroso function.

Fraction 2 is shown to be γ-nitrohexafluorobutyryl fluoride by conversion to the anilide derivative as described in Example VI and by its infrared spectrum (bands at 5.3μ and 6.15μ). The infrared spectrum of this anilide derivative is identical with that of the anilide obtained in Example VI from the rearrangement product of heptafluorocyclobutyl nitrite. The $F^{19}$ n-m-r spectrum of this anilide in chloroform also displays three signals of approximate equal intensity.

*Analysis.*—Calcd. for $C_{10}H_6F_6N_2O_3$: F, 36.07; N, 8.87; M.W., 316.10. Found: F, 35.63; N, 8.58; M.W., 312, 313 (B.P. in ethylene chloride).

(B) In another run a mixture of 9.5 parts of nitrosyl fluoride and 35.0 parts of hexafluorocyclobutanone is prepared at about −50° C. in a 100-part capacity Hastelloy "C" pressure vessel. The mixture is shaken and warmed gradually to 100° C. during a period of two hours. During the warming process, it is observed that a reaction takes place at about −25° C. as indicated by a sharp temperature rise. Seven parts of the blue γ-nitrosohexafluorobutyryl fluoride, B.P. 30–38° C., and six parts of a mixture of the corresponding nitro acid fluoride and starting nitrite, B.P. 38–76° C., are obtained from this reaction. In addition, considerable material (approximately 15 parts) boiling from 76–146° C. and higher is produced. The temperature rise at −25° C. is most probably due to the exothermic addition of nitrosyl fluoride to hexafluorocyclobutanone.

The effect of time and temperature on the thermal decomposition of heptafluorocyclobutyl nitrite in glass is shown by the following tests in which the course of the reaction is followed by means of $F^{19}$ n-m-r: Approximately 0.5 cc. portions of heptafluorocyclobutyl nitrite are sealed in "Pyrex" n-m-r vials and one vial is retained at −80° C. as a control sample at "0" time. Four other vials are placed in a refluxing water bath (100° C.) and samples are withdrawn and rapidly cooled in Dry Ice at the end of seven minutes, 15 minutes, 60 minutes, and 100 minutes. At the end of seven minutes, the sample is deep green; after 15 minutes, a green coloration and considerable attack on glass is noted; at the end of 60 minutes, a blue-green color is noted; at the end of 100 minutes, a light blue color along with considerable light solid ($NO_2SiF_6$ resulting from the attack of NOF on glass) is noted. Each sample is examined by its $F^{19}$ n-m-r pattern. The 15-minute sample shows considerable amounts of γ-nitrosohexafluorobutyryl fluoride. Longer reaction times seem to produce greater amounts of γ-nitrohexafluorobutyryl fluoride (probably resulting from oxidation of the nitroso compound by NOF) and unknown decomposition products. Complete disappearance of the starting nitrite seemed evident after about 30 minutes.

The fluoroketones used as starting materials in the process of this invention can be made by various known methods. Some of the methods are disclosed by Lovelace, Rausch and Postelnek, "Aliphatic Fluorine Compounds," chapter VI, Reinhold Publishing Corp., New York (1958). Perfluoroalkyl ketones (and ω-hydroperfluoroalkyl ketones) can be prepared by reaction of sodium with perfluoroalkane carboxylic esters (and ω-hydroperfluoroalkane carboxylic esters) in ether solution followed by acidification, as described by Hauptschein et al., J. Am. Chem Soc., 77, 4930 (1955).

Perfluorocyclobutanone, which is used as the starting ketone in some of the examples, is a new compound, and is being claimed in coassigned U.S. application Ser. No. 747,701, filed August 28, 1958 and now abandoned, by D. C. England as a continuation-in-part of coassigned application Ser. No. 717,805, filed February 27, 1958 and now abandoned. In the preparation of perfluorocyclobutanone, methyl trifluorovinyl ether, made by treating tetrafluoroethylene with sodium methoxide, is reacted with tetrafluoroethylene in the presence of a polymerization inhibitor at 150° C. for 12 hours. The resulting perfluorocyclobutyl methyl ether is then heated with concentrated sulfuric acid in a closed reaction vessel at 150° C. for 12 hours to form perfluorocyclobutanone hydrate which is in turn treated with phosphorus pentoxide to give perfluorocyclobutanone.

The fluorinated secondary alkyl nitrites and nitrates are useful as solvents for fluorinated polymers. For example, a 3% solution of low molecular weight polytetrafluoroethylene in perfluorocyclobutyl nitrite is used to saturate a piece of filter paper and the paper is air-dried, then washed with acetone, and air-dried again. This leaves a water-repellent paper, as shown by a test whereby water droplets stand up on the paper without wetting it. Heptafluorocyclobutyl nitrate is likewise a solvent for polytetrafluoroethylene.

The γ-nitrosoperfluoroacyl fluorides are useful as blue expansion fluids in low-temperature thermometers, e.g., in the range from −80 to 25° C. Thus, approximately 3.0 g. of γ-nitrosohexafluorobutyryl fluoride is sealed in a glass tube and cooled in Dry Ice. The blue material remains in the liquid state at −80° C. On warming to room temperature, the blue liquid expands and the level of the liquid in the tube increases. The use of a bulb attached to a capillary enhances the observed changes in the level of the liquid. The blue color is desirable for ease of observing the liquid level. Small amounts of the nitroso acid fluoride can be dissolved in inert solvents and the resulting blue solutions can likewise be used as the expansion fluid in low-temperature thermometers.

N-phenyl-γ-nitroperfluoroalkanamides are useful as acid-base indicators. For example, a sample of filter paper is treated with a concentrated solution of N-phenyl-γ-nitrohexafluorobutyramide in methanol and the methanol is evaporated. The dried filter paper is yellow and remains yellow when moistened with dilute sodium hydroxide but changes to red when treated with dilute acid. This process is active when repeated several times.

Since various modifications and equivalents in the invention will be evident to those skilled in the chemical arts, I propose to be bound solely by the appended claims.

The embodiments of the invention in which an exclusive property or privilege is claimed are defined as follows:

1. A process which comprises bringing into intimate contact, at a temperature within the range of from about −195° C. to about 250° C., a compound selected from the group consisting of nitrosyl fluoride and nitryl fluoride with a compound of the formula:

wherein R and R' taken individually are selected from the group consisting of perfluoroalkyl, perfluorocycloalkyl, ω-chloroperfluoroalkyl, and ω-hydroperfluoroalkyl groups and R and R' joined together are a perfluoroalkylene group.

2. The process of claim 1 wherein R and R' are joined together to form a perfluoroalkylene group and the reaction temperature is at least about 15° C.

3. The process of claim 1 wherein the reaction temperature is within the range of from about −80° C. to about 30° C.

4. The process of claim 3 wherein R and R' are joined together to form a perfluoroalkylene group and the reaction product is heated to at least the temperature at which it decomposes to a polyfluoroalkanoyl fluoride.

5. The process which comprises heating a compound of the formula:

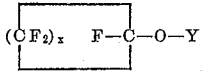

wherein $x$ is a cardinal number greater than 2 and Y is selected from the group consisting of nitroso and nitro radicals, to at least the temperature at which it decomposes to a polyfluoroalkanoyl fluoride.

6. A compound of the formula selected from the group consisting of:

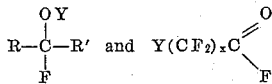

wherein R and R' taken individually are selected from the group consisting of perfluoroalkyl, perfluorocycloalkyl, ω-hydroperfluoroalkyl, and ω-chloroperfluoroalkyl groups and R and R' joined together are a perfluoroalkylene group, Y is a member selected from the group consisting of nitroso and nitro radicals and $x$ is a cardinal number greater than 2.

7. A fluorinated secondary alkyl compound represented by the formula:

wherein Y is selected from the group consisting of nitroso and nitro radicals and R and R' taken individually are selected from the group consisting of perfluoroalkyl, perfluorocycloalkyl, ω-hydroperfluoroalkyl, and ω-chloroperfluoroalkyl and R and R' joined together are a perfluoroalkylene group.

8. The compound of claim 7 wherein OY is a nitrate radical.

9. The compound of claim 7 wherein OY is a nitrite radical.

10. A compound of the formula:

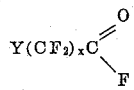

wherein $x$ is a cardinal number greater than 2 and Y is selected from the group consisting of nitroso and nitro radicals.

11. The compound of claim 10 wherein Y is a nitroso radical.

12. The compound of claim 10 wherein Y is a nitro radical.

13. Heptafluorocyclobutyl nitrite.
14. Heptafluorocyclobutyl nitrate.
15. 1,3-dichloropentafluoro-2-propyl nitrite.
16. Pentadecafluoro-4-heptyl nitrite.
17. 1,3-dichloro-1,1,2,3,3-pentafluoro-2-propyl nitrate.
18. γ-Nitrohexafluorobutyryl fluoride.
19. γ-Nitrosohexafluorobutyryl fluoride.
20. Perfluoro secondary alkyl mononitrites.
21. Perfluoro secondary alkyl mononitrates.

References Cited in the file of this patent

FOREIGN PATENTS 770,619    Great Britain _____ Mar. 20, 1957